United States Patent [19]

Wilson et al.

[11] Patent Number: 4,646,415

[45] Date of Patent: Mar. 3, 1987

[54] DEVICE AND METHOD FOR UNFASTENING AND LIFTING A TOP NOZZLE SUBASSEMBLY FROM A RECONSTITUTABLE FUEL ASSEMBLY

[75] Inventors: John F. Wilson, Murrysville Boro; Robert K. Gjertsen, Monroeville, both of Pa.

[73] Assignee: Westinghouse Electric Corp., Pittsburgh, Pa.

[21] Appl. No.: 720,208

[22] Filed: Apr. 4, 1985

[51] Int. Cl.[4] .................. B23P 19/00; B23P 17/00
[52] U.S. Cl. .................. 29/426.5; 29/400 N; 29/723
[58] Field of Search .................. 29/255, 400 N, 723, 29/426.5; 269/48.1

[56] References Cited

U.S. PATENT DOCUMENTS

| | | | |
|---|---|---|---|
| 2,641,831 | 6/1953 | Helton | 29/255 |
| 2,767,677 | 10/1956 | Johnson et al. | 269/48.1 |
| 3,228,678 | 1/1966 | Koger | 269/48.1 |

*Primary Examiner*—Howard N. Goldberg
*Assistant Examiner*—Steven Nichols

[57] ABSTRACT

A device for unfastening and lifting a top nozzle subassembly from the guide thimbles of a reconstitutable fuel assembly includes hollow gripper tubes having open lower ends, spaced yokes mounting the gripper tubes, pull rods disposed in the gripper tubes, end plugs attached to lower ends of the pull rods and disposed at the open lower ends of the gripper tubes, stop plugs stationarily disposed in the gripper tubes spaced above their open lower ends, elastomer blocks disposed in the gripper tubes between the end and stop plugs, and inner tubes disposed within the gripper tubes about the elastomer blocks. Lower end portions of the gripper tubes are capable of insertion into sleeves of the top nozzle subassembly to positions therein located adjacent to threaded lower ends of the sleeves. The pull rods are disposed within the gripper tubes for axial movement upwardly and downwardly within the tubes, with the end plugs being extendible into and from the gripper tube open lower ends upon such movement of the pull rods. In such arrangement, movement of each pull rod upwardly displaces the end plug thereon toward the stop plug and causes diametric expansion of the block which, in turn, causes diametric expansion of the gripper tube into engagement with the sleeve adjacent to the threaded lower end thereof, whereas movement of the pull rod downwardly displaces the end plug thereon away from the stop plug and allows diametric contraction of the block which, in turn, allows diametric contraction of the gripper tube out of engagement with the sleeve. Each gripper tube lower end portion contains spaced axial slots for facilitating diametric expansion of the gripper tube which enables subsequent unthreading of the sleeve from the guide thimble. Also, the inner tube about the elastomer block is axially slotted and oriented such that its slots are circumferentially displaced from those of the gripper tube so as to prevent the elastomer block from extruding outwardly through the slots of the gripper tube when the block is diametrically expanded.

12 Claims, 13 Drawing Figures

DEVICE AND METHOD FOR UNFASTENING AND LIFTING A TOP NOZZLE SUBASSEMBLY FROM A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Locking Tube Removal And Replacement Tool And Method In A Reconstitutable Fuel Assembly" by John M. Shallenberger et al, assigned U.S. Ser. No. 670,418 and filed Nov. 9, 1984.

2. "Top Nozzle Removal And Replacement Fixture And Method In A Reconstitutable Fuel Assembly" by John M. Shallenberger et al, assigned U.S. Ser. No. 670,729 and filed Nov. 13, 1984.

3. "Locking Tube Insertion Fixture And Method In A Reconstitutable Fuel Assembly" by John M. Shallenberger et al, assigned U.S. Ser. No. 689,696 and filed Jan. 8, 1985.

4. "Locking Tube Removal Fixture And Method In A Reconstitutable Fuel Assembly" by John M. Shallenberger et al, assigned U.S. Ser. No. 695,762 and filed Jan. 28, 1985.

5. "Improved Removable Top Nozzle Subassembly For A Reconstitutable Nuclear Fuel Assembly" by John F. Wilson et al, assigned U.S. Ser. No. 701,052 and filed Feb. 12, 1985.

BACKGROUND OF THE INVENTION

1. Field of the Invention

The present invention relates generally to fuel assemblies for nuclear reactors and, more particularly, is concerned with a device and method for unfastening and lifting a top nozzle subassembly from a reconstitutable fuel assembly.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pat. Nos. 3,770,583 (Re. 31,583) and 3,814,667 to Klumb et al and U.S. Pat. No. 4,269,661 to Kmonk et al.

Due to occasional failure of some fuel rods during normal reactor operation and in view of the high costs associated with replacing fuel assemblies containing failed fuel rods, the trend is currently toward making fuel assemblies reconstitutable in order to minimize operating and maintenance expenses. Convention reconstitutable fuel assemblies incorporate design features arranged to permit the removal and replacement of individual failed fuel rods. Reconstitution has been made possible by providing a fuel assembly with a removable top nozzle. The top nozzle is mechanically fastened usually by a threaded arrangement to the upper end of each control rod guide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its useful life.

One reconstitutable fuel assembly construction, devised recently, is illustrated and described in the last U.S. patent application cross-referenced above. It incorporates a top nozzle subassembly which can be removed from and replaced onto the fuel assembly as a unit.

The top nozzle subassembly includes an upper hold-down plate, an enclosure having a lower adapter plate, a plurality of elongated tubular sleeves disposed between the upper and lower plates, and a plurality of hold-down springs extending between the plates and about the respective sleeves. The upper hold-down plate has a plurality of passageways defined therethrough, while the lower adapter plate has a plurality of openings, the passageways and openings being arranged in respective patterns which are matched to that of the guide thimbles of the fuel assembly. The elongated sleeves are slidably inserted at their respective upper ends into the respective passageways of the upper hold-down plate and at their lower ends are releasably threaded to the upper ends of the guide thimbles. The lower ends of the sleeves cooperate with lower retainers attached to the guide thimbles below the lower adapter plate in holding the adapter plate at a stationary position on the guide thimbles. The sleeves slide axially in the upper hold-down plate passageways to accommodate thermal growth between the fuel assembly and upper core plate.

When all of the sleeves are unthreaded from the upper ends of the guide thimbles, the top nozzle is in condition for removal from the remainder of the fuel assembly for reconstitution thereof. Due to the cross-sectional size of each sleeve and due to a slidable interconnection between the upper hold-down plate and the enclosure of the top nozzle which limits movement of the plates away from one another, each sleeve remains captured between the slidably interconnected upper and lower plates of the top nozzle. The elongated sleeve is hollow so that, in addition to accommodating insertion of a control rod through it, a suitable tool can be inserted into the sleeve for gripping it internally to rotate it in either direction for threading on or unthreading from the upper end of the guide thimble.

While the reconstitutable fuel assembly construction briefly described above has demonstrated considerable promise as a measure by which domestic and foreign utilities can minimize both operating and maintenance expenses, a need exists for means to effectively and efficiently carry out removal and replacement of the top nozzle subassembly of the reconstitutable fuel assembly so as to enhance commercial acceptance thereof.

SUMMARY OF THE INVENTION

The present invention provides a remotely operated, submersible device designed to satisfy the aforementioned needs. The device is operable to remove and subsequently remount or replace the top nozzle subassembly of a reconstitutable fuel assembly, such as the one disclosed in the last application cross-referenced above, at a reactor plant. After the top nozzle has been removed, the upper ends of the fuel rods are exposed from the top of the reconstitutable fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once inspection, removal, replacement and/or rearrangement of the fuel rods is completed, the top nozzle is placed back on the upper ends of the guide thimbles by using the same device.

Accordingly, the present invention sets forth for use with a reconstitutable fuel assembly including at least one guide thimble having an upper end portion and a top nozzle subassembly having a lower adapter plate with at least one opening, an upper hold-down plate with at least one passageway positioned above and aligned with the lower adapter plate opening, at least one hold-down spring disposed and extending between the upper and lower plates and at least one elongated tubular hollow sleeve disposed and extending between the upper and lower plates, wherein the upper end portion of the guide thimble extends upwardly through the opening in the lower adapter plate and has a threaded terminal end disposed above the adapter plate and wherein the elongated sleeve has a threaded lower end threadably fastened to the threaded terminal end of the guide thimble and an upper end extending upwardly through the passageway of the upper hold-down plate, a device and method for unfastening and lifting the top nozzle subassembly from the fuel assembly guide thimbles.

The device for unfastening and lifting the top nozzle subassembly includes: (a) at least one hollow gripper tube, the tube having an open lower end; (b) means mounting the gripper tube for vertical alignment with and insertion of its lower end portion into the elongated sleeve of the top nozzle subassembly to a position therein located above and adjacent to the threaded lower end of the sleeve; (c) force-generating means disposed within the gripper tube for axial movement upwardly and downwardly within the tube and also disposed at the open lower end of the gripper tube for extension into and from the gripper tube open lower end upon axial movement upwardly and downwardly within the gripper tube; and (d) resiliently expandable means stationarily fitted within the lower end portion of the gripper tube at a location spaced upwardly from the open lower end of the tube and in the path of movement of the force-generating means, whereby movement of the force-generating means in one direction causes compression in length and expansion in diameter of the expandable means which, in turn, causes diametric expansion of the gripper tube into engagement with the elongated sleeve at the location above and adjacent to the threaded lower end thereof, whereas movement of the force-generating means in an opposite direction allows extension in length and contraction in diameter of the expandable means which, in turn, allows diametric contraction of the gripper tube out of engagement with the elongated sleeve.

More particularly, the gripper tube mounting means includes upper and lower spaced apart yokes mounting the gripper tube such that the lower end portion of said tube extends below said lower yoke and is capable of vertical alignment with and insertion into the elongated sleeve of the top nozzle subassembly to a position therein located above and adjacent to the threaded lower end of the sleeve. Also, the force-generating means includes a pull rod and an end plug. The pull rod is disposed within the gripper tube for axial movement upwardly and downwardly within the tube and has a lower end portion which is generally coextensive with the lower end portion of the gripper tube. The end plug is attached to the lower end portion of the pull rod and disposed at the open lower end of the gripper tube. It is extendible into anf from the gripper tube open lower end upon axial movement of the pull rod upwardly and downwardly within the gripper tube.

Still further, the resiliently expandable means includes a stop plug and an elastomer block. The stop plug is stationarily fitted within the lower end portion of the gripper tube at a location spaced upwardly from the open lower end of the tube, with the pull rod being mounted for slidable movement relative to and through the stop plug. The elastomer block slidably receives the pull rod therethrough and is disposed within the lower end portion of the gripper tube between the stop plug fitted within the gripper tube and the end plug on the pull rod extending through the gripper tube and elastomer block.

With such an arrangement, movement of the pull rod upwardly displaces the end plug thereon toward the stop plug and causes decrease in height and increase in diameter of the block therebetween which, in turn, causes diametric expansion of the gripper tube into engagement with the elongated sleeve at the location above and adjacent to the threaded lower end thereof. On the other hand, movement of the pull rod downwardly displaces the end plug thereon away from the stop plug and allows increase in height and decrease in diameter of the block therebetween which, in turn, allows diametric contraction of the gripper tube out of engagement with the elongated sleeve. The gripper tube is also mounted for rotation such that when the lower end portion of the gripper tube is expanded into engagement with the elongated sleeve, rotation of the gripper tube in one predetermined direction cause unthreading of the sleeve lower end from the guide thimble upper terminal end, whereas rotation of the gripper tube in the opposite predetermined direction causes threading of the sleeve lower end into the guide thimble upper terminal end.

Additionally, the lower end portion of the gripper tube contains a plurality of axial slots at the location therealong above and adjacent to the threaded lower end of the elongated sleeve for facilitating diametric expansion of the gripper tube. Also, the device includes a thin-walled, axially slotted inner tube placed inside the gripper tube contiguous to the slots contained in the gripper tube but circumferentially oriented in relationship thereto such that the elastomer material is prevented from extruding outwardly through the slots of the gripper tube.

The method of using the device to unfasten the top nozzle subassembly includes the operative steps of: (a) inserting into he elongated sleeve of the top nozzle subassembly the lower end portion of a gripper tube to a position therein located above and adjacent to the threaded lower end of the sleeve; (b) axially extending an end plug into a lower open end of the gripper tube so as to compress and diametrically expand an elastomer block disposed therein between the end plug and a stop plug stationarily fitted within the lower end portion of the gripper tube at a location spaced upwardly from the open lower end of the tube; (c) engaging the diametrically expanded elastomer block with the gripper tube at the lower end portion thereof so as to cause diametric expansion of the gripper tube into engagement with the elongated sleeve at the location above and adjacent to the threaded lower end thereof; and (d) rotating the gripper tube so as to cause unthreading of the sleeve engaged therewith from the guide thimble.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Figure 1:
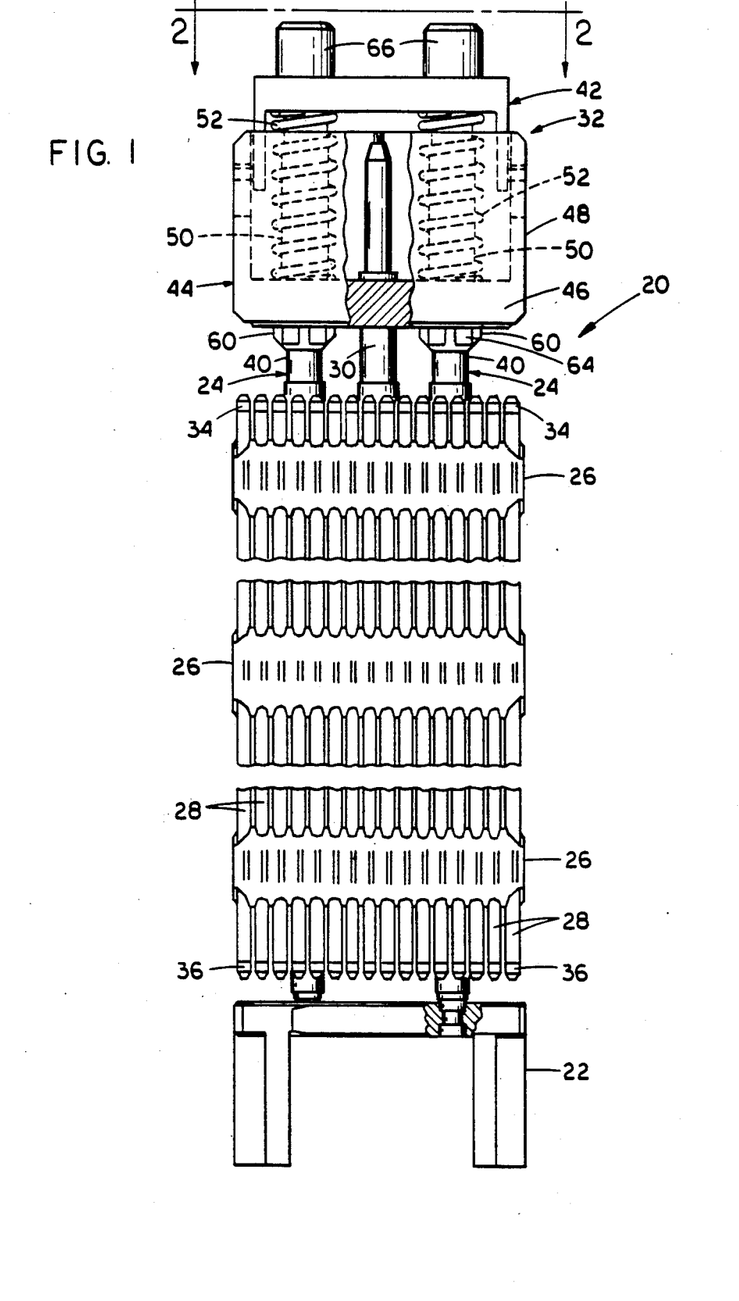
FIG. 1 is an elevational view, with parts broken away for clarity, of a reconstitutable fuel assembly having a top nozzle subassembly removable and replaceable using the device of the present invention.
Figure 2:
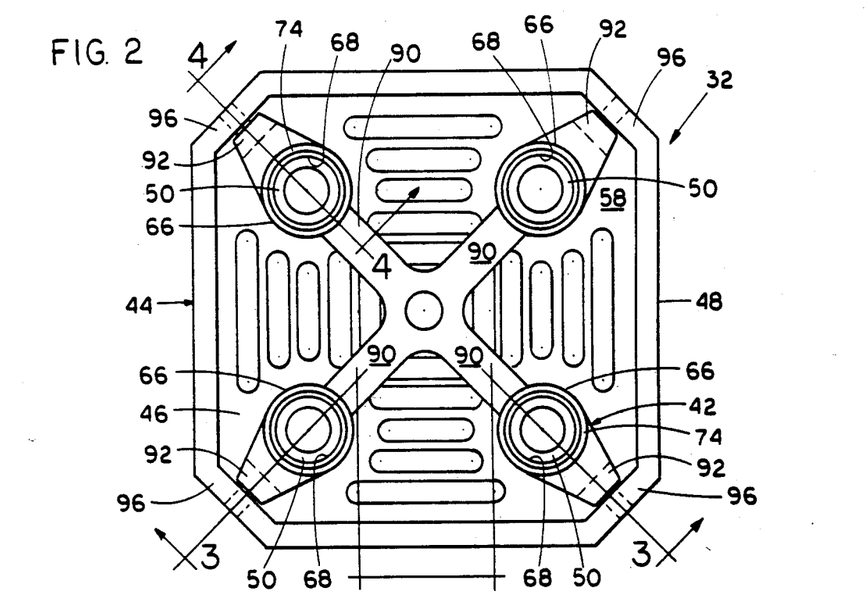
FIG. 2 is an enlarged top plan view of the top nozzle subassembly as seen along line 2—2 of FIG. 1.
Figure 3:
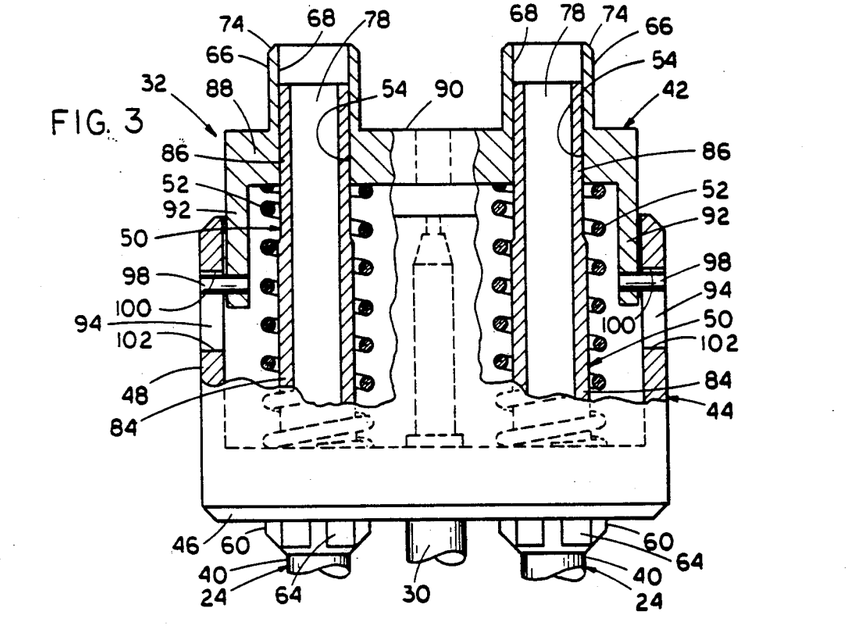
FIG. 3 is an enlarged elevational view of the top nozzle subassembly as taken along line 3—3 of FIG. 2, with parts thereof broken away and sectioned to reveal the components of the top nozzle.

Referring now to the drawings, and particularly to FIG. 1, there is shown an elevational view of a reconstitutable nuclear reactor fuel assembly, represented in vertically foreshortened form and being generally designated by the numeral 20. Basically, the fuel assembly 20 includes a lower end structure or bottom nozzle 22 for supporting the assembly on the lower core (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has a instrumentation tube 30 located in the center thereof and an upper end structure or top nozzle 32 attached to the upper ends of the guide thimbles 24. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and is closed at its opposite ends by upper and lower end plugs 34,36. The fuel pellets composed of fissile material are responsible for creating the reactive power of the reactor. A liquid moderator/coolant such as water, or water containing boron, is pumped upwardly through the guide thimbles 24 and along the fuel rods 28 of the fuel assembly 20 in order to extract heat generated therein for the production of useful work.

To control the fission process, a number of control rods (not shown) are reciprocally movable in the guide thimbles 24 located at predetermined positions in the fuel assembly 20. Since the control rods are inserted into the guide thimbles 24 from the top of the fuel assembly 20, the placement of the components forming the top nozzle 32 and their attachment to the guide thimbles 24 must accommodate the movement of the control rods into the guide thimbles 24 from above the top nozzle 32.

Top Nozzle for Aligning Fuel Assembly with Upper Core Plate

Turning now to FIGS. 1 to 4, the top nozzle subassembly 32 which engages and aligns the fuel assembly 20 with the upper core plate 38 (FIG. 4) of the reactor core is mounted on the upper end portions 40 of the guide thimbles 24 of the assembly. The top nozzle subassembly 32 includes an upper hold-down plate 42, an enclosure 44 having a lower adapter plate 46 and an upstanding sidewall 48 surrounding and attached to the periphery of the adapter plate, a plurality of elongated tubular hollow sleeves 50 disposed between the upper and lower plates 42,46, and a plurality of hold-down coil springs 52 extending between the upper and lower plates 42,46 and about the respective sleeves 50. The upper hold-down plate 42 has a plurality of passageways 54 defined therethrough, while the lower adapter plate 46 has a plurality of openings 56, the passageways 54 and openings 56 being arranged in respective patterns which are matched to that of the guide thimbles 24 of the fuel assembly 20.

Figure 4:
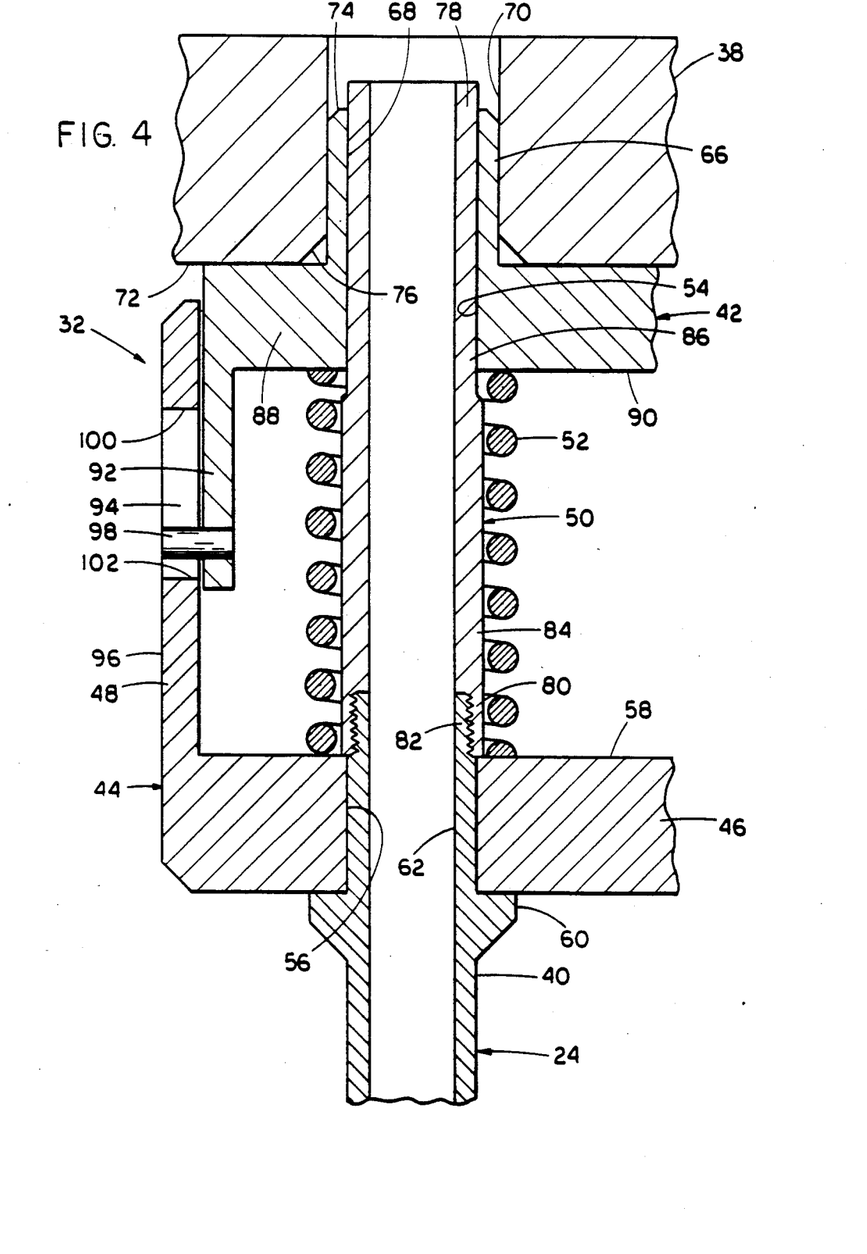
FIG. 4 is an enlarged fragmentary sectional view of the top nozzle subassembly as taken along line 4—4 of FIG. 2.

More particularly, the upper end portions 40 of the guide thimbles 24 extend upwardly through the openings 56 in the lower adapter plate 46 and above the upper surface 58 thereof. A plurality of lower retainers 60 are attached, such as by brazing, to the guide thimbles 24 below the lower adapter plate 46 for limiting downward slidable movement of the adapter plate 46 relative to the guide thimbles 24 and thereby supporting the adapter plate on the guide thimbles with upper ends 62 (only one of which is shown in FIG. 4) thereof extending above the adapter plate. Each lower retainer 60 on one guide thimble 24 has a series of scallops 64 formed on its periphery which are aligned with those of the fuel rods 28 grouped about the respective one guide thimble so that the fuel rods may be removed and replaced during reconstitution of the fuel assembly 20.

Furthermore, the top nozzle 32 includes a plurality of upstanding bosses 66 having respective central bores 68 defined therethrough. The bosses 66 are disposed above the upper hold-down plate 42, and each boss 66 is attached to the hold-down plate 42 such that its central bore 68 is aligned with a respective one of the passageways 54 of the hold-down plate. Additionally, each boss 66 is of a cross-sectional size adapted to interfit within one of a plurality of holes 70 (only one of which is seen in FIG. 4) formed in the upper core plate 38 which opens at a lower side 72 of the core plate. The upper circumferential edge 74 of each boss 66 is chamfered for mating with a complementarily chamfered edge 76 on the lower side 72 of the upper core plate 38 at the entrance to each of the holes 70 defined therein. Edges having such shapes act as guiding surfaces which facilitate alignment and insertion of the respective bosses 66 into the corresponding holes 70 in the upper core plate 38 during installation of the fuel assembly within the reactor core.

Still further, the elongated sleeves 50 extending between the upper and lower plates 42,46 are slidably inserted at their respective upper ends 78 into the respective passageways 54 of the upper hold-down plate and the corresponding aligned bores 68 of the upstanding bosses 66. At their lower ends 80, the sleeves 50 are releasably connected to the upper ends 62 of the guide thimbles 24 so as to cooperate with the lower retainers 60 in holding the lower adapter plate 46 at a stationary position on the guide thimbles 24. Specifically, as seen in FIG. 4, each of the lower ends 80 of the sleeves 50 is internally threaded for making a releasable threaded connection with an externally threaded section 82 on each of the upper ends 62 of the respective guide thimbles 24. The sleeve 50 is hollow so that, in addition to accommodating insertion of a control rod through it, a suitable device, to be disclosed below, can be inserted into the sleeve for gripping it internally to rotate it in either direction for threading on or unthreading from the upper end 62 of the guide thimble 24. When threaded on the upper end 62 of the guide thimble 24, the sleeve 50 cooperates with the lower retainer 60 to clamp the adapter plate 46 therebetween. The sleeves 50 slide axially in the passageways 54 of the hold-down plate 42 and the bores 68 of the bosses 66 to accommodate thermal growth between the fuel assembly 20 and the upper core plate 38. However, at no time do the sleeves 50 contact the upper core plate. Also, the sleeves protect the control rods (not shown) from crossflow and support the inside diameter of the hold-down springs 52 to prevent them from buckling.

When all of the sleeves 50 are unthreaded from the upper ends 62 of the respective guide thimbles 24, the top nozzle subassembly 32 is in condition for removal from the remainder of the fuel assembly 20 for reconstitution thereof. However, due to the crosssectional size of each of the sleeves 50, it stays in place between the upper and lower plates 42,46 of the top nozzle. Particularly, each sleeve 50 has a lower portion 84 of a cross-sectional diameter that is greater than that of an upper portion 86 thereof and also greater than the size of the diameter of the one passageway 54 of the upper hold-down plate 42. Thus, the sleeve 50 cannot be withdrawn through the passageway 54 and so it remains captured between the upper and lower plates 42,46, as also does the respective hold-down coil spring 52 encompassing the sleeve 50, when each sleeve is released from its threaded connection with its respective guide thimbles 24.

Also, the upper hold-down plate 42 is composed of an array of hubs 88 and ligaments 90 which extend between and interconnect the hubs. Each of the hubs 88 has one of the passageways 54 defined therethrough. Furthermore, one boss 66 is disposed above and connected to each of the hubs 88 with the bore 68 of the boss aligned with the respective passageway 54 of the hub. Further, the spaced upper and lower plates 42,46 are interconnected so as to accommodate movement of the lower plate 46 toward and away from the upper plate 42 upon axial movement of the guide thimbles 24 of the fuel assembly 20, such as due to thermal growth, toward and away from the upper core plate 38. Means interconnecting the plates 42,46 includes a plurality of lugs 92 attached to the outer sides of the hubs 88 of the upper hold-down plate 42. The lugs 92 extend downwardly from the hubs 88 at the periphery of the upper plate 42 and are respectively coupled to the upstanding sidewall 48 of the enclosure 44. Specifically, a generally vertical slot 94 is defined in each of four corners 96 of the generally rectangular enclosure sidewall 48. Also, a pin 98 is mounted in the lower end of each lug 92 and extends into one of the slots 94 for slidable movement therealong between upper and lower ends 100,102 thereof which respectively define the limits of movement of the lower adapter plate 46 toward and away from the upper hold-down plate 42. The pin 98 is removable in order to facilitate the assembling and disassembling of the upper plate 42 with and from the enclosure 44. Thus, by such arrangement, the above-described interconnecting means effectively limits movement of the lower adapter plate 46 away from the upper hold-down plate 42 so as to maintain the springs 52 in a state of compression therebetween and the sleeves 50 captured between the upper and lower plates.

From the above description of the top nozzle subassembly 32, it will be seen that the subassembly can be lifted as a unit from the guide thimbles 24 of the fuel assembly 20 to prepare the assembly for reconstitution activities after simply unfastening each of the elongated sleeves 50 from the respective upper ends 62 of the guide thimbles 24. The unfastening and lifting of the top nozzle subassembly 32 is accomplished through use of the device of the present invention, generally designated by the numeral 104 in FIG. 5, which will now be described in detail.

Device for Unfastening and Lifting Top Nozzle Subassembly

Figure 5:
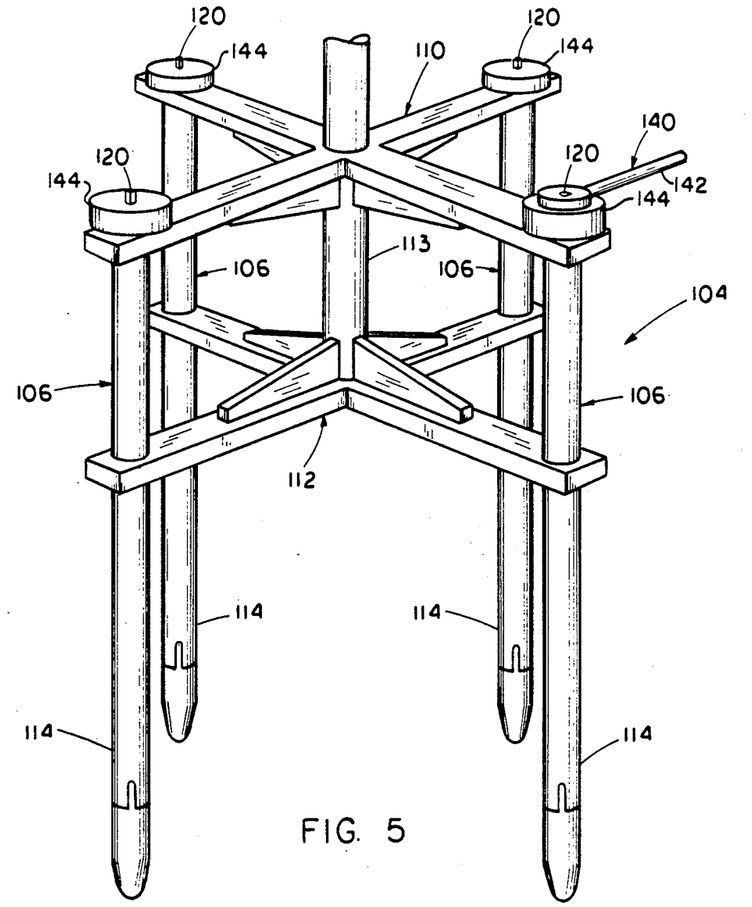
FIG. 5 is a perspective view of the unfastening and lifting device of the present invention.

Referring now to FIGS. 5 through 9, there is shown the device 104 useful in both unfastening and lifting the top nozzle subassembly 32 as a unit from the fuel assembly guide thimbles 24. The device 104 basically includes a plurality of hollow gripper tubes 106, with each tube having an open lower end 108. A pair of upper and lower spaced apart yokes 110,112 interconnected by a central shaft 113 mounting the gripper tubes 106 in horizontally spaced apart relationship in which lower end portions 114 of the respective tubes which extend below the lower yoke 112 are capable of vertical alignment with an insertion from above into the hollow elongated sleeves 50 of the top nozzle subassembly 32, as schematically shown in FIG. 5, to positions therein located above and adjacent to the internally-threaded lower ends 78 of the sleeves (see left side of FIG. 12).

Also, the device 104 includes force-generating means in the form of a plurality of pull rods 116 and end plugs 118. Each pull rod 116, being much smaller in diameter than each of the gripper tubes 106, is disposed within one of the gripper tubes for rotational movement relative to the tube and concurrently axial movement upwardly and downwardly within the tube. Also, each pull rod 116 has an upper end portion 120 which extends upwardly from the gripper tube 106 above the upper yoke 110 and a lower end portion 122 which is generally coextensive with the lower end portion 114 of the gripper tube. Attached to the lower end portions 122 of the respective pull rods 116 and disposed at the open lower ends 108 of the gripper tubes 106 are the plurality of end plugs 118. Each end plug 118 is extendible into and from its respective gripper tube open lower end 108 upon axial movement of the pull rod 116 to which it is attached upwardly and downwardly within the gripper tube 106.

Further, the device 104 includes resiliently expandable means in the form of a plurality of stop plugs 124 and elastomer blocks 126. Each stop plug 124 is stationarily fitted within the lower end portion 114 of one of the gripper tubes 106 at a location spaced upwardly from the open lower end 108 of the tube. A central passage 128 in each stop plug 124 mounts that one of the pull rods 116 within the gripper tube 106 for slidable movement relative to and through the stop plug. Each elastomer block 126 is comprised of material such as polyurethene. The block 126 has a central hole 130 which slidably receives the one of the pull rods 116 of the gripper tube 106 within which the block is disposed.

The elastomer block 126 is disposed within the lower end portion 114 of one of the gripper tubes 106 between the stop plug 124 fitted therein and the end plug 118 on the particular pull rod 116 extending through the one gripper tube as well as through the elastomer block.

In addition, the device 104 includes a plurality of thin-walled hollow inner tubes 132 which are placed inside the respective gripper tubes 106 about the respective elastomer blocks 126 therein. A series of axially-extending, circumferentially spaced apart slots 134 are formed in each inner tube 132. Likewise, the lower end portion 114 of each gripper tube 106 contains a plurality of similar axially-extending, circumferentially spaced apart slots 136 at the location therealong aligned above and adjacent to the threaded lower end 80 of the elongated sleeve 50 into which the gripper tube 106 is inserted. The slots 136 in the gripper tube 106 facilitate diametric espansion in the region thereof adjacent the slots.

Figure 9:
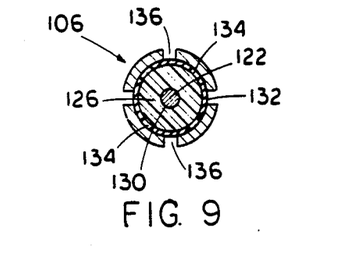
FIG. 9 is a sectional view of the lower end portion of the gripper tube as taken along line 9—9 of FIG. 8, illustrating orientation of the series of spaced slots formed in the inner tube relative to the elastomer block and the series of spaced slots formed in the gripper tube prior to diametric expansion of the elastomer block and gripper tube.
Figure 11:
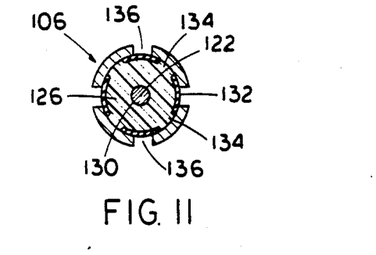
FIG. 11 is a sectional view similar to that of FIG. 9, but illustrating the relative orientation of the components after diametric expansion of the elastomer block and the gripper tube.

As will be explained below, diametric expansion of the gripper tube 106 is effected by diametric expansion of the elastomer block 126. Such expansion of the gripper tube 106, in turn, diametrically expands the lower end 80 of the sleeve 50 which reduces friction forces at the threaded joint between the sleeve and guide thimble and thereby enables subsequent unthreading of the sleeve from the guide thimble upper end 62. As seen in FIGS. 9 and 11, the slots 134 of the inner tube 132 are most advantageously positioned contiguous to the slots 136 contained in the gripper tube 106 but circumferentially oriented in spaced relationship thereto so that the elastomer block 126 is prevented from extruding outwardly through the slots 136 of the gripper tube 106. Also, an outer upper peripheral edge 138 of each of the end plugs 118 is inwardly and upwardly tapered to prevent extrusion of the elastomer block 126 downward past the end plug as it is extended into the open lower end 108 of the gripper tube 106.

Figure 8:
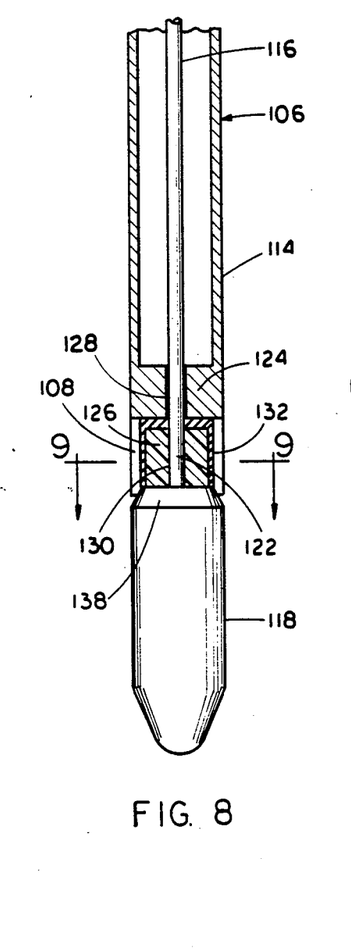
FIG. 8 is an enlarged fragmentary elevational view, in section, of the lower end portion of one of the gripper tubes of the device, illustrating the pull rod, end plug, stop plug, elastomer block and inner tube associated with the gripper tube in their respective positions prior to expansion of the elastomer block and the gripper tube.
Figure 10:
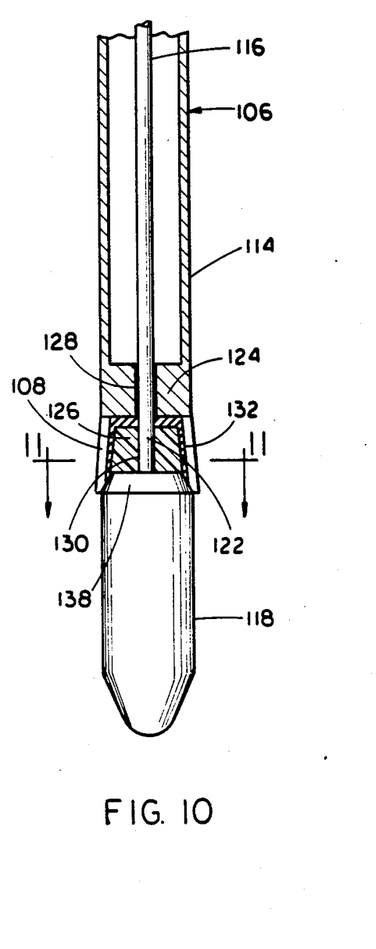
FIG. 10 is an elevational view, in section, similar to that of FIG. 8, but illustrating the components associated with the gripper tube in their respective positions after diametric expansion of the elastomer block and the gripper tube.
Figure 12:
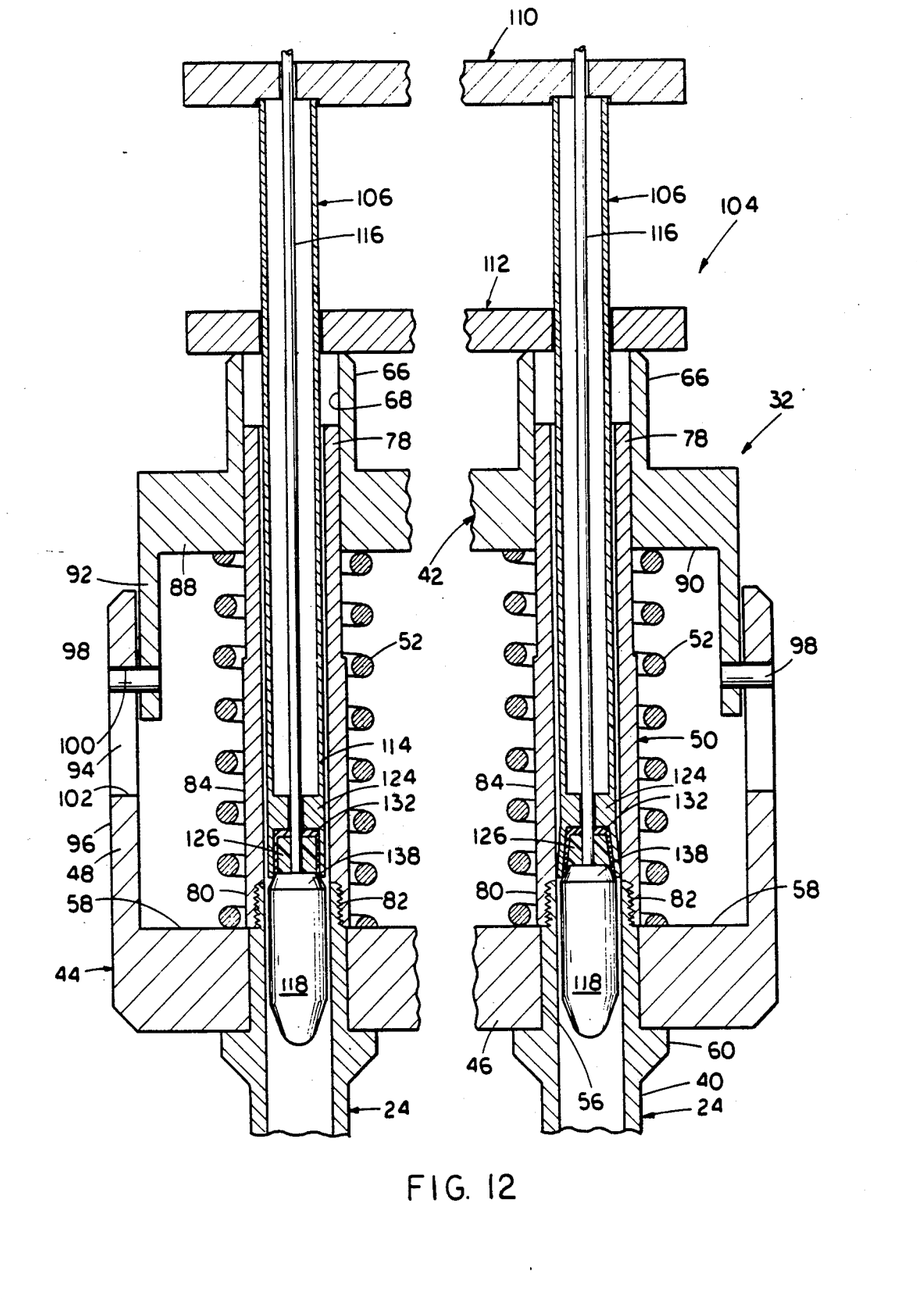
FIG. 12 is an enlarged fragmentary elevational view of the device of FIG. 5, showing a section through the top nozzle subassembly and two of the gripper tubes and their associated components inserted in two of the sleeves of the top nozzle subassembly, with the gripper tube in the left sleeve being depicted prior to being expanded into engagement with the sleeve while the gripper tube in the right sleeve is depicted expanded into engagement with the sleeve for unthreading the same.

With the aforementioned arrangement of components of the device 104, movement of each pull rod 116 upwardly, from its position seen in FIG. 8 and the left side of FIG. 12 to the position seen in FIG. 10 and the right side of FIG. 12, displaces the end plug 118 thereon toward the stop plug 124, compressing the elastomer block 126 therebetween. That decreases the height and increases the diameter of the block 126 which, in turn, causes diametric expansion of the gripper tube 106 into tight frictional engagement with the elongated sleeve 50 surrounding the gripper tube at the location on the sleeve above and adjacent to its threaded lower end 80. On the other hand, reverse movement of the pull rod 116 downwardly displaces its end plug 118 away from the stop plug 124 and allows relaxation of the elastomer block 126. That allows the block 126 to increase in height and decrease in diameter which, in turn, allows diametric contraction of the gripper tube 106 out of engagement with the elongated sleeve 50.

To effect unfastening of the sleeves 50 from the guide thimbles 24 not only must the pull rods 116 be movable rotationally and axially within the gripper tubes 106 to cause engagement of the tubes with the sleeves, but also the gripper tubes must be rotatable in order to unthread the sleeves from the guide thimbles. Toward this end, the gripper tubes 106 are rotatably mounted to the upper and lower yokes 110,112 such that when the lower end portions 114 of the gripper tubes are expanded into engagement with the elongated sleeves 50, rotation of the gripper tubes in one predetermined direction will cause rotation of the sleeves and unthreading of the sleeve lower ends 80 from the guide thimble upper terminal ends 82. On the other hand, rotation of the gripper tubes 106 in the opposite predetermined direction causes opposite rotation of the sleeves 50 and threading of the sleeve lower ends 80 back into the guide thimble upper terminal ends 82.

Figure 6:
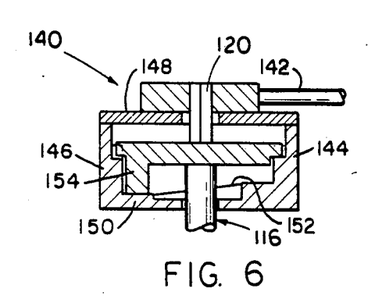
FIG. 6 is an enlarged fragmentary elevational view of one of the cam levers for actuating the expandible gripper tubes of the device.
Figure 7:
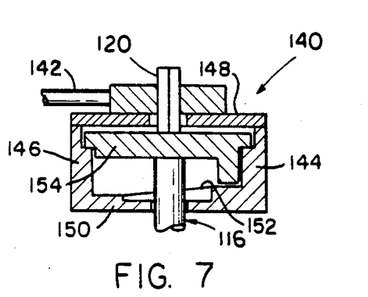
FIG. 7 is another elevational view of one of the cam levers of FIG. 6.

Rotational and axial movement of the pull rods 116 and rotation of the gripper tubes 106 are controlled by a plurality of cam devices 140. Each cam device 140 is composed of a lever 142 being attached above the upper yoke 110 to the upper end portion 120 of the pull rod tubes, as seen in FIGS. 5 to 7. Each cam device 140 also includes a housing 144 having a clindrical side wall 146 with opposite top and bottom end walls 148,150. One pull rod 116 extends upwardly through the end walls of each housing 144. The bottom end wall 150 has an upper inclined cam surface 152, and a cam follower 154 is attached about each respective pull rod 116 and positioned between the bottom and top end walls 148,150. Rotation of the lever 142 in one direction initially causes concurrent rotational and upward axial movement of the pull rod 116 within the gripper tube 106 due to the cam follower 154 riding on the cam surface 152, as seen in FIGS. 6 and 7. When the pull rod 116 reaches the axial position shown in FIG. 7, it has moved sufficiently to effect diametric expansion of the gripper tube 106. Then, axial movement of the pull rod ceases and only rotation of the pull rod 116 continues and rotation of the gripper tube now commences to effect unthreading of the sleeve 50. By rotating the cam lever 142 in reverse, the opposite occurs in reverse sequence. First, the gripper tube 106 and sleeve 50 with which it is engaged and the pull rod 116 are rotated to thread the sleeve back on the guide thimble 24. Then, the pull rod 116 is both rotated and moved downwardly in the gripper tube 106, allowing the gripper tube to contract and disengage from the sleeve.

Method of Using Device to Unfasten and Lift Top Nozzle Subassembly

Once the reconstitutable fuel assembly 20 is placed into a work station and mounted in position for removal of its top nozzle subassembly 32 and inspection of its fuel rods 28, the device 104 is used for unfastening and lifting the top nozzle subassembly from the guide thimble 24 of the fuel assembly. First, the device 104 is maneuvered so as to align its gripper tubes 106 with the elongated sleeves 50 of the top nozzle subassembly 32 whereupon the gripper tubes can then be inserted therein until their lower end portions 114 reach positions located immediately above and adjacent to the threaded lower ends 80 of the sleeves, such as seen in FIG. 8 and in the left side of FIG. 12.

Next, by operating the cam levers 140 usually one at a time, the end plugs 118 are axially extended into the open lower ends 108 of the gripper tubes 106 so as to compress and diametrically expand the elastomer blocks 126 disposed therein between the end plugs 118 and the stop plugs 124. Diametric expansion of the elastomer blocks 126 results in diametric expansion of the slotted lower end portion 114 of the gripper tubes 106 which, in turn, engages the tubes 106 with the elongated sleeves at the locations above and adjacent to the threaded lower end 80 thereof, as seen in FIG. 10 and the right side of FIG. 12.

Figure 13:
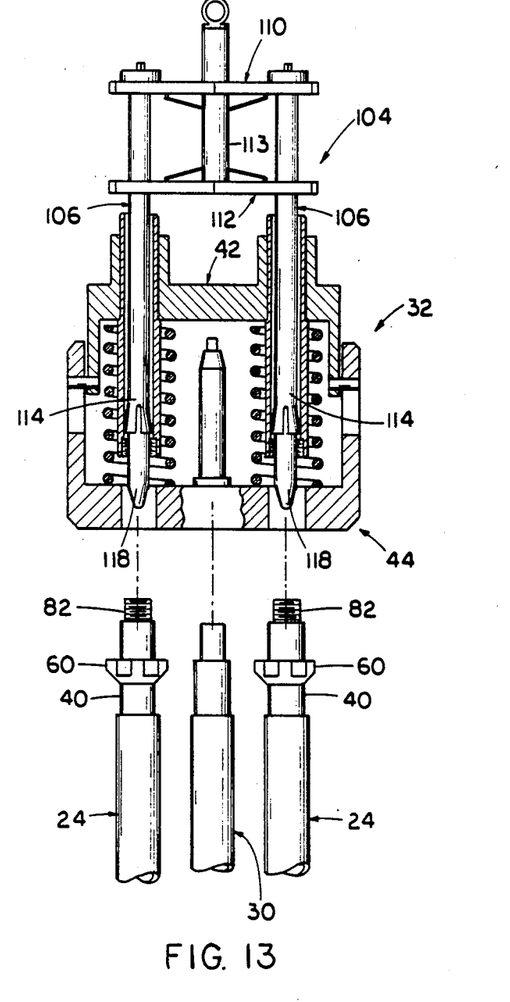
FIG. 13 is a view similar to FIG. 12, but illustrating the device lifting the unfastened top nozzle subassembly from the guide thimbles of the reconstitutable fuel assembly.

Then, by rotating the gripper tubes 106, the sleeves 50 are also rotated and their lower ends 82 unthreaded from the guide thimble upper ends 62. Once all of the sleeves 50 are unthreaded, by raising the gripper tubes 106 while engaged with the unthreaded sleeves, as seen in FIG. 13, the top nozzle subassembly can be lifted as a unit by the device 104 from the guide thimbles 24 of the fuel assembly 20. The top nozzle subassembly 24 of the fuel assembly 20. The top nozzle subassembly 32 can be replaced back on the guide thimbles 24 by reversing the above-outlined steps. The bullet-shaped configuration of the end plugs 118 serve as guides in placing the top nozzle subassembly back in the guide thimbles.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. For use with a reconstitutable fuel assembly including at least one guide thimble having an upper end portion and a top nozzle subassembly having a lower adapter plate with at least one opening, an upper hold-down plate with at least one passageway positioned above and aligned with said lower adapter plate opening, at least one hold-down spring disposed and extending between said upper and lower plates and at least one elongated tubular hollow sleeve disposed and extending between said upper and lower plates, said upper end portion of said guide thimble extending upwardly through said opening in said lower adapter plate and having a threaded terminal end disposed above said adapter plate, said threaded terminal end of said guide thimble and an upper end extending upwardly through said passageway of said upper hold-down plate, a device for unfastening and lifting said top nozzle subassembly from said guide thimble of said fuel assembly, comprising:

(a) at least one hollow gripper tube, said tube having an open lower end;

(b) means mounting said gripper tube for vertical alignment with and insertion of its lower end portion into said elongated sleeve of said top nozzle subassembly to a position therein located above and adjacent to said threaded lower end of said sleeve;

(c) force-generating means disposed within said gripper tube for rotatable movement and concurrent axial movement upwardly and downwardly within said tube and also disposed at said open lower end of said gripper tube for extension into and from said gripper tube open lower end upon axial movement upwardly and downwardly within said gripper tube;

(d) resiliently expandable means stationarily fitted within said lower end portion of said gripper tube at a location spaced upwardly from said open lower end of said tube and in the path of movement of said force-generating means, whereby movement of said force-generating means in one direction causes compression in length and expansion in diameter of said expandable means which, in turn, causes diametric expansion of said gripper tube into engagement with said elongated sleeve at said location above and adjacent to said threaded lower end thereof, whereas movement of said force-generating means in an opposite direction allows extension in length and contraction in diameter of said expandable means which, in turn, allows diametric contraction of said gripper tube out of engagement with said elongated sleeve;

(e) said mounting means also rotatably mounting said gripper tube such that when said lower end portion of said gripper tube is expanded into engagement with said elongated sleeve, rotation of said gripper tube in one predetermined direction causes unthreading of said sleeve lower end from said guide thimble upper terminal end, whereas rotation of said gripper tube in the opposite predetermined direction causes threading of said sleeve lower end into said guide thimble upper terminal end;

(f) means connected to said force-generating means and being operable for causing rotation thereof in either one or the other opposite rotational directions; and (g) cam means coupled to said force-generating means for causing axial movement thereof upwardly in said gripper tube upon rotation of said force-generating means in a predetermined one of said respective opposite rotational directions until said force-generating means has caused diametric expansion of said gripper tube into engagement with said elongated sleeve after which said cam means permits said force-generating means to continue rotation in said predetermined one rotational direction without concurrent movement axially, said continued rotation of said force-generating means in said one direction after causing diametric expansion of said gripper tube into engagement with said elongated sleeve causing rotation of said gripper tube in the one of said predetermined rotational directions thereof for unthreading said sleeve lower end from said guide thimble upper terminal end.

2. The device as recited in claim 1, wherein said gripper tube mounting means includes upper and lower spaced apart yokes mounting said gripper tube such that said lower end portion of said tube extends below said lower yoke and is capable of vertical alignment with and insertion into said elongated sleeve of said top nozzle subassembly to a position therein located above and adjacent to said threaded lower end of said sleeve.

3. The device as recited in claim 1, wherein said force-generating means includes:
a pull rod disposed within said gripper tube for rotational movement and concurrent axial movement upwardly and downwardly within said tube, said rod having a lower end portion which is generally coextensive with said lower end portion of said gripper tube; and
an end plug attached to said lower end portion of said pull rod and disposed at said open lower end of said gripper tube, said end plug being extendible into and from said gripper tube open lower end upon axial movement of said pull rod upwardly and downwardly within said gripper tube.

4. The device as recited in claim 3, wherein:
said pull rod has an upper end portion which extends upwardly from said gripper tube; and
said cam means is connected to said upper end portion of said pull rod and operable for causing selected axial movement of said pull rod upwardly and downwardly within said gripper tube upon selected rotation of said pull rod in said respective rotational directions.

5. The device as recited in claim 3, wherein said resiliently expandable means includes:
a stop plug stationarily fitted within said lower end portion of said gripper tube at a location spaced upwardly from said open lower end of said tube, said pull rod being mounted for slidable movement relative to and through said stop plug; and
an elastomer block slidably receiving said pull rod therethrough and being disposed within said lower end portion of said gripper tube between said stop plug fitted within said gripper tube and said end plug on said pull rod extending through said gripper tube and elastomer block, whereby movement of said pull rod upwardly displaces said end plug thereon toward said stop plug and causes decrease in height and increase in diameter of said block therebetween which, in turn, causes diametric expansion of said gripper tube into engagement with said elongated sleeve at said location above and adjacent to said threaded lower end thereof, whereas movement of said pull rod downwardly displaces said end plug thereon away from said stop plug and allows increase in height and decrease in diameter of said block therebetween which, in turn, allows diametric contraction of said gripper tube out of engagement with said elongated sleeve.

6. The device as recited in claim 5, wherein an outer upper peripheral edge of said end plug is inwardly and upwardly tapered to prevent extrusion of said elastomer block as said end plug is extended into said open lower end of said gripper tube.

7. The device as recited in claim 1, wherein said lower end portion of said gripper tube contains a plurality of axial slots of said location therealong above and adjacent to said threaded lower end of said elongated sleeve for facilitating diametric expansion of said gripper tube which enables subsequent unthreading of said sleeve from said guide thimble.

8. The device as recited in claim 1, further comprising a thin-walled, axially slotted inner tube placed inside said gripper tube contiguous to said slots contained in said gripper tube but circumferentially oriented in relationship thereto such that said resiliently expandable means is prevented from extruding outwardly through said slots of said gripper tube.

9. For use with a reconstitutable fuel assembly including a plurality of guide thimbles having upper end portions and a top nozzle subassembly having a lower adapter plate with a plurality of openings, an upper hold-down plate with a plurality of passageways positioned above and aligned with said respective lower adapter plate openings, a plurality of hold-down springs disposed and extending between said upper and lower plates and a plurality of elongated tubular hollow sleeves disposed and extending between said upper and lower plates, said upper end portions and said guide thimbles extending upwardly through said openings in said lower adapter plate and having externally-threaded terminal ends disposed above said adapter plate, said elongated sleeves having internally-threaded lower ends threadably fastened to said threaded terminal ends of said guide thimbles and upper ends extending upwardly through said passageways of said upper hold-down plate, a device for unfastening and lifting said top nozzle subassembly from said guide thimbles of said fuel assembly, comprising:

(a) a plurality of hollow gripper tubes, each of said tubes having an open lower end;

(b) upper and lower spaced apart yokes mounting said gripper tubes in horizontally spaced apart relationship in which lower end portions of said tubes which extend below said lower yoke are capable of vertical adjustment with and insertion into said plurality of elongated sleeves of said top nozzle subassembly to positions therein located above and adjacent ot said internally-threaded lower ends of said sleeves;

(c) a plurality of pull rods, one rod being disposed within each of said gripper tubes for rotational movement and concurrent axial movement upwardly and downwardly within said tube, each rod having an upper end portion which extends from said gripper tube above said upper yoke and a lower end portion which is generally coextensive with said lower end portion of said gripper tube;

(d) a plurality of end plugs, each end plug being attached to said lower end portion of one of said pull rods and disposed at said open lower end of one of said gripper tubes, said each end plug being extendible into and from said gripper tube open lower end upon axial movement of each pull rod upwardly and downwardly within said gripper tube;

(e) a plurality of stop plugs, each stop plug being stationarily fitted within said lower end portion of one of said gripper tubes at a location spaced upwardly from said open lower end of said tube, one of said pull rods being mounted for slidable movement relative to and through said each stop plug;

(f) a plurality of elastomer blocks, each block slidably receiving one of said pull rods therethrough and being disposed within said lower end portion of one of said gripper tubes between said stop plug fitted within said gripper tube and said end plug on said pull rod extending through said gripper tube and elastomer block, whereby movement of said pull rod upwardly displaces said end plug thereon toward said stop plug and causes decrease in height and increase in diameter of said block therebetween which, in turn, causes diametric expansion of said gripper tube into engagement with said elongated sleeve at said location above and adjacent to said threaded lower end thereof, whereas movement of said pull rod downwardly displaces said end plug thereon away from said stop plug and allows increase in height and decrease in diameter of said block therebetween which, in turn, allows diametric contraction of said gripper tube out of engagement with said elongated sleeve;

(g) said gripper tubes being rotatably mounted to said upper and lower yokes such that when said lower end portions of said gripper tubes are expanded into engagement with said elongated sleeves, rotation of said gripper tubes in one predetermined direction cause unthreading of said sleeve lower ends from said guide thimble upper terminal ends, whereas rotation of said gripper tubes in the opposite predetermined direction causes threading of said sleeve lower ends into said guide thimble upper terminal ends;

(h) means connected to said upper end portion of each said pull rod and being operable for causing rotation thereof in either one or the other opposite rotational directions; and (i) cam means coupled to each said pull rod upper end portion for causing axial movement thereof upwardly in said gripper tube upon rotation of said pull rod in a predetermined one of said respective opposite rotational directions until said pull rod has caused diametric expansion of said gripper tube into engagement with said elongated sleeve after which said cam means permits said pull rod to continue rotation in said predetermined one rotational direction without concurrent movement axially, said continued rotation of said pull rod in said one direction after causing diametric expansion of said gripper tube into engagement with said elongated sleeve causing rotation of said gripper tube in the one of said predetermined rotational directions thereof for unthreading said sleeve lower end from said guide thimble upper terminal end.

10. The device as recited in claim 9, wherein said lower end portion of said each gripper tube contains a plurality of axial slots at said location therealong above and adjacent to said threaded lower end of said elongated sleeve for facilitating diametric expansion of said gripper tube which enables subsequent unthreading of said sleeve from said guide thimble.

11. The device as recited in claim 10, further comprising a thin-walled, axially slotted inner tube placed inside said each gripper tube contiguous to said slots contained in said respective gripper tube but circumferentially oriented in relationship thereto such that said elastomer block is prevented from extruding outwardly through said slots of said gripper tube.

12. The device as recited in claim 9, wherein an outer upper peripheral edge of each of said end plugs is inwardly and upwardly tapered to prevent extrusion of said each elastomer block as said end plug is extended into said open lower end of said respective gripper tube.

* * * * *